United States Patent Office 2,800,484
Patented July 23, 1957

2,800,484

6-HYDROXY-TROPINONE

Arthur Stoll, Arlesheim, near Basel, Ernst Jucker, Binningen, near Basel, and Balthasar Becker, Basel, Switzerland, assignors, by mesne assignments, to Sandoz & Co., Newark, N. J., as nominee of Fidelity Union Trust Company No Drawing. Application March 31, 1953,
Serial No. 346,032

Claims priority, application Switzerland April 4, 1952

1 Claim. (Cl. 260—294.7)

The present invention relates to 6-hydroxy-tropinone and to the preparation thereof.

According to this invention, 6-hydroxy-tropinone which corresponds to the formula

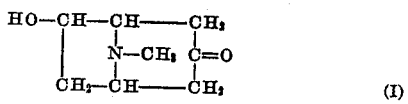

(I)

is prepared by reacting malic dialdehyde with methylamine and with acetone dicarboxylic acid. The course of the reaction is illustrated by the following scheme:

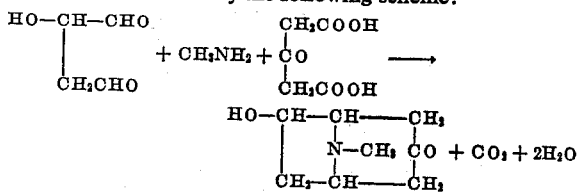

Preferably, a weakly acid, aqueous solution having a known content of malic dialdehyde is added to a solution of acetone dicarboxylic acid or aforesaid ester thereof and amine; the reaction mixture is buffered with a suitable salt and then allowed to stand for several days at room temperature (about 20–25° C.) or at a slightly elevated temperature. The reaction is complete when no further evolution of carbon dioxide takes place. After making the solution alkaline, the thus-produced 6-hydroxy-tropinone is extracted with a suitable water-immiscible solvent, such as ether, chloroform, benzene or toluene. Further purification can be effected by distillation in a high vacuum.

The malic dialdehyde can be prepared in various ways. A preferred method (disclosed in copending application, Ser. No. 197,832, filed November 27, 1950, and now abandoned by Arthur Stoll and Ernst Jucker) starts with a 2,5-dialkoxy- or 2,5-diacyloxy-dihydrofurane and, by the addition of hypobromous or hypochlorous acid or by treatment with a suitable salt such as tertiary butyl hypochlorite, produces the corresponding 2,5-dialkoxy- or 2,5-diacyloxy-dihydrofurane, as for example according to the reaction scheme:

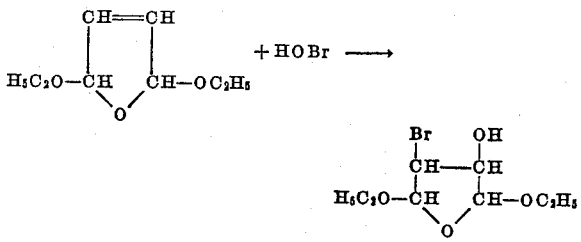

The thus-produced compound is then treated (e. g. according to copending application, Ser. No. 346,031, filed on even date herewith) with catalytic hydrogen, in the presence of e. g. Raney nickel and in the presence of an acid-binding agent, such as KOH to take up hydrogen halide. The resultant 2,5-dialkoxy- or 2,5-diacyloxy-3-hydroxy-tetrahydrofurane is then hydrolyzed by means of a weak mineral acid, e. g. 0.1 N hydrochloric acid, to produce the desired malic dialdehyde. The latter need not be isolated for the purposes of the present invention, but may be used in the form of the aqueous acid solution.

The 6-hydroxy-tropinone, which can be prepared by the present invention, forms—by virtue of the 6-positioned hydroxyl group—a link with the interesting 3,6-dihydroxy-tropane derivatives. The 6-hydroxy-tropinone thus forms an important intermediate for the preparation of the latter which are significant physiologically active compounds. Thus, for example, 6-hydroxy-tropinone can be hydrogenated with the aid of Raney nickel to produce the 3,6-dihydroxy-tropane which, by the action of isovalerianic acid yields the tropa alkaloid valeroidine, the physiological significance is well-known. This conversion may be summarized as follows:

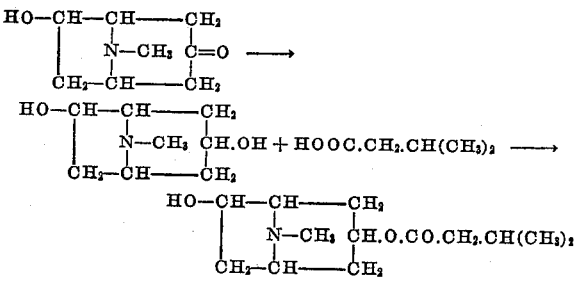

The following example sets forth a presently-preferred representative embodiment of the invention, and is intended to be illustrative but not limitative of the latter. In the example, parts by weight bear the same relation to parts by volume as do grams to cubic centimeters. The temperatures are in degrees centigrade.

Example

A weakly acid, aqueous solution containing 1/20 mol of malic dialdehyde (prepared from 8.8 parts by weight of 2,5-diethoxy-3-hydroxy-tetrahydrofurane and 200 parts by volume of 0.1 N hydrochloric acid) is added to a solution containing 14.6 parts by weight of acetone dicarboxylic acid (1/10 mol), 6.75 parts by weight of methyl amine hydrochloride (1/10 mol) and 34 parts by weight of sodium acetate (1/4 mol) in 1000 parts by volume of water. If necessary, a little dilute hydrochloric acid or caustic soda is added to the solution to adjust the pH to 4.0 and the reaction mixture is then kept for 3 days at 25°. At the end of this time, the evolution of carbon dioxide has ceased and the pH of the solution has risen to approximately 4.7.

The reaction mixture is worked up by adding potassium carbonate until strongly alkaline, saturating with salt, and then extracting for 20 hours with chloroform in an extractor. The chloroform solution is evaporated to dryness, leaving a brownish oil which may solidify on standing. The product is either crystallized direct from a mixture of alcohol and ether or first distilled. It boils at 110–120° at 0.5 mm. and crystallizes during the distillation to a colorless solid.

The thus-obtained 6-hydroxy-tropinone melts at 123° and sublimes in high vacuum at approximately 100°.

The picrate of 6-hydroxy-tropinone can be prepared by treating the ketone with the calculated quantity of saturated, aqueous picric acid. It crystallizes from water in fine needles melting at 199–201° with decomposition. From alcohol it separates in hexagonal plates.

Having thus disclosed the invention what is claimed is:
6-hydroxy-tropinone.

References Cited in the file of this patent

UNITED STATES PATENTS 1,419,091   Willstatter et al. -------- June 6, 1922

FOREIGN PATENTS 177,807   Great Britain ---------- June 28, 1923

OTHER REFERENCES

Schopf et al.: Annalen, vol. 558, pages 109–24 (1947).
Sheehan et al.: Jour. Am. Chem. Soc., vol. 74, pages 3825–28, Jan. 7, 1952.